Jan. 9, 1962   J. J. TRANI   3,015,904
FISHING LURES
Filed Jan. 7, 1960   2 Sheets-Sheet 2
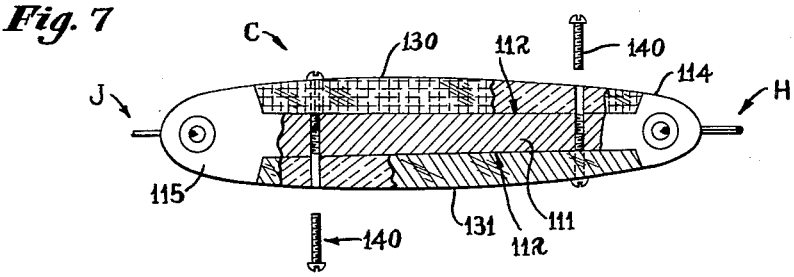
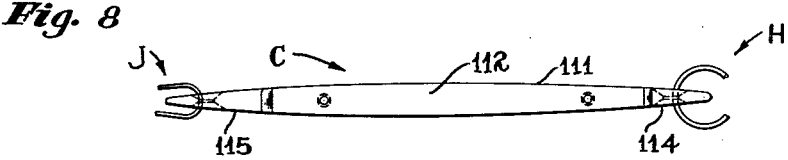
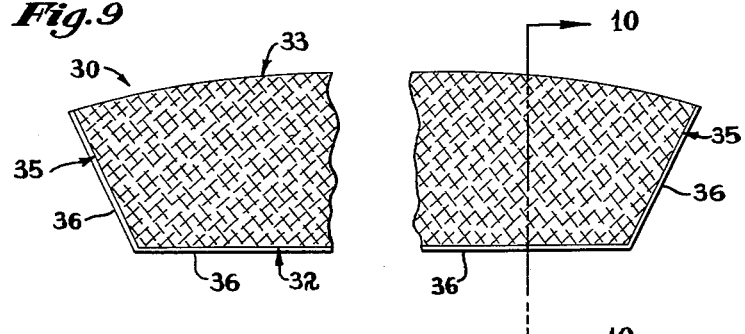
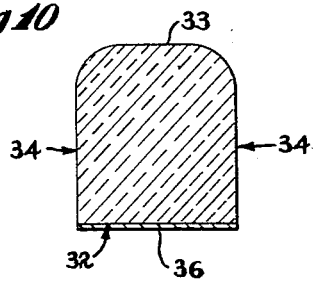
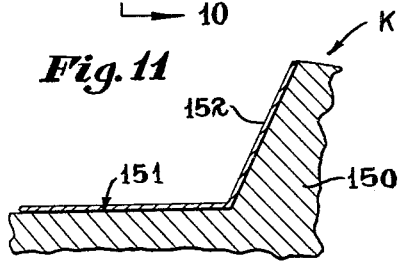
INVENTOR
JOHN J. TRANI
BY
ATTORNEYS _United States Patent Office_ 3,015,904
Patented Jan. 9, 1962

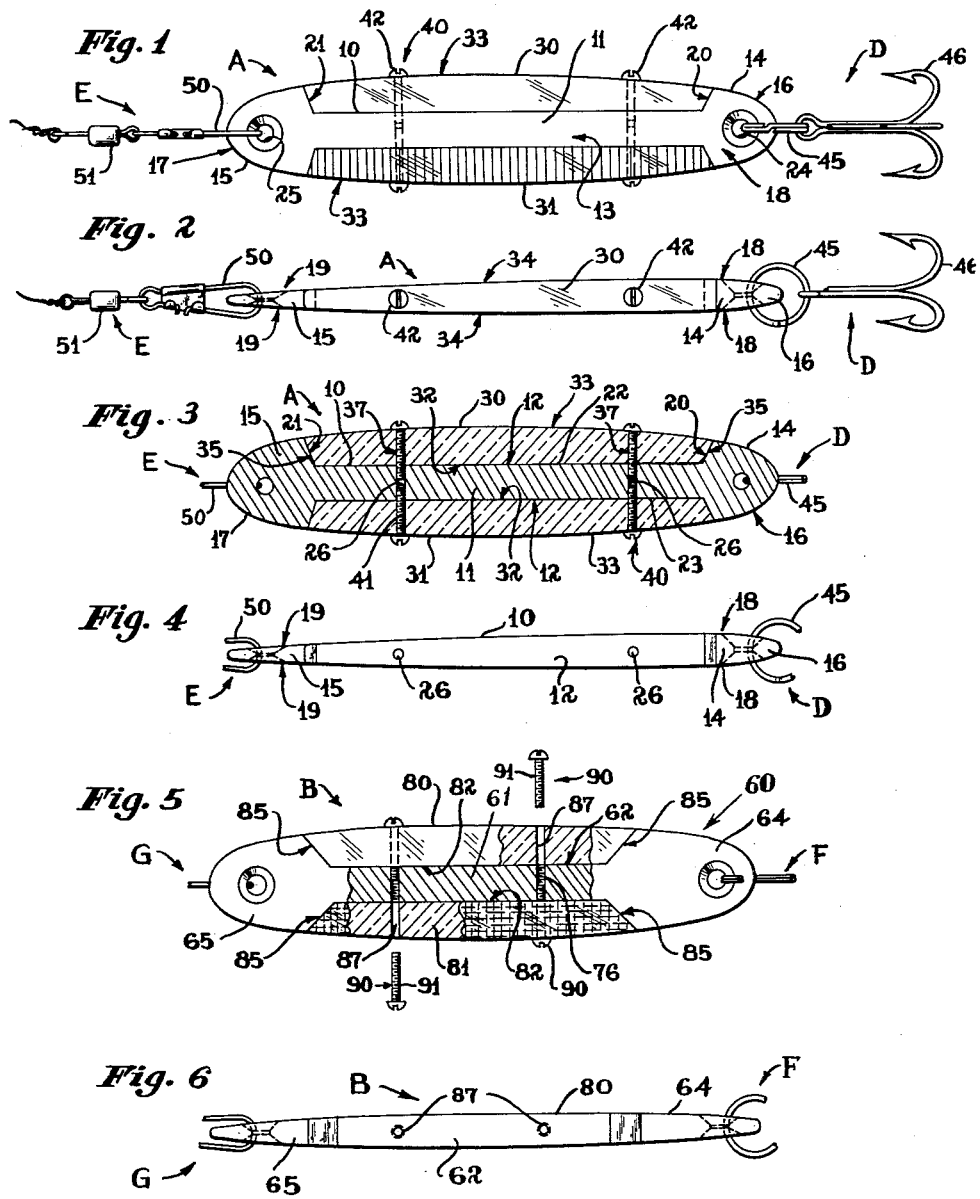

3,015,904
FISHING LURES
John J. Trani, 9 Lytle St., Princeton, N.J.
Filed Jan. 7, 1960, Ser. No. 1,013
1 Claim. (Cl. 43—42.09)

This invention relates to fishing lures in the form of artificial fishing bait and, more particularly, to such bait provided with interchangeable parts.

An important object of the invention is to provide such lures, which are oblong and curvilinear in side elevation and preferably of slight thickness, whereby when properly attached to a line and provided with barbs, the lures will turn when drawn through the water.

Another important object is to provide lures as described above having main body portions having open-sided recesses to receive inserts of translucent colored material, each provided with a coating or layer of material contrasting in color with that of the color of the insert and in contact with the walls of the recess so that, as the lures turn on their longitudinal axes in the water, a fish-attracting changeable display of color is provided.

Still another important object is to provide lures as above, having central, longitudinally-extending strips of light-reflecting metal which, in addition to providing a support for the inserts, also provides added visual means for attracting fish.

Other objects and advantages of the invention will be apparent during the course of the following detailed description of the invention, taken in connection with the accompanying drawing, forming a portion of this disclosure, and in which drawing:

FIG. 1 is an elevational view of one form of the invention.

FIG. 2 is a plan view thereof, with an insert in place.

FIG. 3 is a vertical longitudinal sectional view thereof.

FIG. 4 is a view along the lines of FIG. 2 but with the insert removed.

FIG. 5 is generally an elevational view, but partly in vertical section, of another form of the invention.

FIG. 6 is a plan view of the form of FIG. 5.

FIG. 7 is a view, mostly in vertical longitudinal section, of a third form of the invention.

FIG. 8 is a plan view of the form of FIG. 7.

FIG. 9 is a fragmentary vertical sectional view, greatly enlarged, of an example of an insert forming a portion of any or all of the forms, and containing an opaque base layer or coating.

FIG. 10 is a transverse sectional view substantially on the line 10—10 of FIG. 9.

FIG. 11 is a fragmentary vertical sectional view, greatly enlarged, of a modification in which the layer or coating of FIGS. 9 and 10 is carried by the main body of the lure.

In the drawings, wherein for the purpose of illustration are shown three forms of the invention and wherein similar reference characters designate corresponding parts throughout the several views; the letter A designates the form of FIGS. 1, 2, 3 and 4; B, the form of FIGS. 5 and 6; C, the form of FIGS. 7 and 8; d, f, h. hook means, and E, G and J, line attaching means, while K is the modification of FIG. 11.

The fishing lures A, B and C have, in common, a main body, comprising preferably a relatively slender central portion and enlarged end portions preferably integral therewith, with the central portion having light rays-reflecting outer faces, opposite inner faces, and the end portions of the main body having light rays-reflecting outer faces and inner faces extending to the inner faces of the central portion whereby two recesses are provided, defined by these inner faces and adapted to snugly receive colored preferably translucent interchangeable inserts, which may be provided, on one or more of their faces in contact with the faces of the central and end portions, with preferably opaque coatings or layers of material of a color contrasting with that of the insert to which it is applied, or these coatings or layers may be provided on one or more of the surfaces of the recesses. Means is provided to detachably secure the inserts to the main body, so that selections of colored inserts may be made.

Referring first to the lure A of FIGS. 1, 2, 3 and 4, the same includes a main body 10 comprising a preferably relatively slender central portion 11 having opposite inner faces 12 and opposite outer side faces 13 extending between the faces 12, with the main body provided with enlarged end portions 14 and 15 which are preferably integral with the central portion. Each end portion is preferably rounded at its outer edges 16 and 17, as the case may be, and the outer side faces 18 and 19, as the case may be, merge into the outer side faces 13. Extending from the ends of the inner faces 12 are preferably outwardly-extending faces 20 and 21 at the inner ends of the enlarged end portions 14 and 15. The faces 12, 20 and 21 define two recesses 22 and 23, preferably of the same size and shape, for the reception of inserts 30 and 31 to be subsequently described. It will be noted, particularly in FIG. 4, that the recess 22 tapers in width being widest at the enlarged end portion 14 and preferably gradually narrows, being narrowest at the enlarged end portion 15. This is characteristic of the opposite recess 23. The enlarged end portions 14 and 15 preferably also differ in width, with the portion 14 being wider than the end portion 15. Consequently, the lure is lighter in weight at and adjacent the end portion 15 for reasons subsequently explained.

The enlarged end portion 14 may be provided with an opening or eye 24 extending therethrough from one outer side face 18 to the other outer side face 18 to facilitate attachment of hook means D to be later described, and the enlarged end portion 15 may also be provided with an opening or eye 25 therethrough, extending from one outer side face 19 to the other outer side face 19 to facilitate attachment of line means E also to be later described.

Cooperating with means 40 to detachably secure the inserts 30 and 31 in the recesses 22 and 23 may be spaced-apart screw-threaded bores or sockets 26 extending through the central portion from one inner face 12 to the other inner face 12. Both bores or sockets may have their mouths beveled.

The main body 10 may be of metal, as chromium, copper, brass, stainless steel, and the like, but I prefer chromium or a metal which has a very good light rays-reflecting surface and it should be noted that the end portion 15 is of greater size than the end portion 14.

Referring now to the inserts 30 and 31, for positioning in the recesses 22 and 23 respectively, each is of a size and shape to fit snugly in the respective recesses. Each insert comprises a body of preferably transparent or translucent material with an inner face 32, an outer face 33 opposite the face 32, side faces 34 joining the faces 32 and 33, and end faces 35 joining the faces 32, 33 and 34. The face 33 merges into the edges 16 and 17 of the end portions 14 and 15 respectively, and the side faces 4 merge into the side faces 13. The inserts 30 and 31 are preferably of hardened plastic material, which material is colored, such as shades of red, blue or yellow, although I may also employ near whites, as cream or ivory. From FIG. 2, it will be seen that the insert 30 also tapers in width, as does the recess 22. This is also characteristic of the opposite insert 31.

An important feature of the inserts 30 and 31 is shown in FIGS. 9 and 10, which are enlarged vertical sectional views of one insert. This feature is a layer or coating 36 over the inner face 32 and, preferably, continued over the end faces 35. This coating or layer is preferably opaque and of a color contrasting with that of the body of the insert. For example, a light blue or light green insert body may have a black coating or layer, or a red or yellow insert body may have a white coating or layer. The coating or layer is, of course, of waterproof paint or an adhering one of hardened plastic material, by way of example, secured to the hardened plastic to form an integral body.

Cooperating with the means 40 to attachably secure the inserts 30 and 31 in the recesses 22 and 23 may be spaced-apart bores 37 extending through the inserts and coatings or layers from the inner face 32 to the opposite outer face 33, and positioned so that, when the inserts are snugly within the recesses, the bores 26 and 37 will axially align.

Means 40 to detachably secure the inserts 30 and 31 to the main body 10, within the recesses 23, may be screws with the screw threaded portions of their shanks 41 mating with the screw threads of the bores 26 and the other portions of the shanks extending through the bores 37 and the heads 42 of the screws, screwed down upon the faces 33 of the inserts. The screws may be of iron, copper or bronze, for example, but chromium or stainless steel is preferred.

Carried by the enlarged end portion 14 may be hook means D which may comprise a ring 45 extending through the opening or eye 24 and supporting a suitable hook or barb assembly 46.

Carried by the enlarged end portion 15 may be line attaching means E which may comprise a snap hook 50 engaging the opening or eye 25 and carrying a swivel 51 (so that the lure may rotate on its longitudinal axis when pulled through the water) to which may be secured a line.

The fishing lure of form B of FIGS. 5 and 6, comprises the same elements as the fishing lure A, but is a heavier lure, since the weight of material in the enlarged end portions 64 and 65 joining the central portion 61 of the main body 60 is greater than in the respective end portions 14 and 15, and the end portion 64 is larger than the end portion 65. Of course, this causes the inserts 80 and 81 to be somewhat shorter than the insers 30 and 31 if the overall lengths of the lures A and B are the same. It will be noted, in FIG. 6, that the width of the recess 62 is substantially the same throughout its length. The lure is lighter at the end portion 65, for reasons later detailed. Otherwise the faces, edges, recesses and bores are like the corresponding faces, edges, recesses and bores of the lure A, and the coatings or layers upon the faces 82 and 85 of the inserts are like the coatings or layers 36. Means 90 to detachably secure the inserts 80 and 81 to the central portion 61 may be screws with their shanks 91 extending through aligning bores 76 and 87. The hook means F may be like the hook means D while the line-attaching means G may be similar to the line-attaching means E.

As for the lure of form C of FIGS. 7 and 8, this contemplates a variation where a very light-weight lure is provided, with the hook means-carrying end portion 114 of less size and, consequently, of less weight than the end portions 14 and 64 and of much less weight than the line means-carrying end portion 115. In this lure, the recesses 112 taper in width, but are narrowest at the end portion 114 so that the lure is heavier at and adjacent the end portion 115, which is the larger and heavier end portion. The reasons for this construction will be explained later. The inserts 130 and 131, preferably are substantially like the inserts 30, 31, 80 and 81, are detachably secured to the central portion 111 of the lure C by means 140 corresponding with the means 40 and 90, and this hook means H may be like the hook means D and F while the line-attaching means J may be like the line-attaching means E and G.

If desired, the opaque layers or coatings may be applied, as shown in FIG. 11, to the surface of the recesses of the main body of the lure, where a main body 150 is illustrated and this is provided with recesses 151, disposed as are the recesses 22, 23, 62 and 112, having a coating or layer 152 of opaque material, substantially like the materials of the coatings or layers 36.

The lures are particularly useful in so-called "heavy bodies" of water, such as salt water.

By the term "relatively slender" I mean, for example, a central portion having a height of from $7/32''$ to $5/8''$, a length of from $2\frac{1}{4}''$ to $3''$.

For their size and shape, the lures are preferably relatively heavy, weighing, for example, from $1\frac{1}{4}$ ounces to $1\frac{1}{2}$ ounces each (including the inserts), although the lure C is the lightest in weight.

The various layers or coatings (all being substantially alike, except as to color) cause an intermittent reflection or "twinkle" when the lure turns or wobbles, and this cooperates with the reflection of the finish (as chromium) of the main body of the lure (as the lure turns or wobbles) to cause this reflection to appear and disappear as the lure first turns broadside and then interposes the edge of the insert in the line of vision of the fish.

The shapes and weights of the lures are very important since, with the weight on the barb ends of the lures A and B, when using for surf casting, the lures would give more casting distance because they do not flip or wobble in the air when cast but go out in a straight line. The action of the lures varies, of course, with the speed of the retrieve. With a normal retrieve the lures A and B will zig-zag and roll from side to side. But if they are pulled with a fast retrieve, the lures will turn over. Lure C is designed mainly for trolling from a boat but could be used from the surf, also.

Various changes may be made in the size, shape and arrangement of parts to the forms of the invention herein shown and described, without departing from the spirit of the invention or scope of the claim.

What is claimed is:

An elongate fishing lure including a main body having fish hook and line attaching means therein comprising a slender central portion disposed at the central longitudinal axis of the lure, and enlarged end portions all of opaque material, with said longitudinal axis extending through the centers of said enlarged end portions, said slender central portion having two narrow side faces and each of said enlarged end portions having outer edges and two side faces, wider than the width of said narrow side faces of said central portion, all portions of said side faces and outer edges being exterior exposed faces of said lure and having light rays-reflecting colored faces, said central portion having two opposite substantially parallel narrow flat inner faces substantially normal to said two narrow side faces, and each of said enlarged end portions having narrow flat inner faces extending from the outer edges thereof to said narrow inner flat faces of said central portion and, with said narrow inner flat faces, defining two open-sided recesses; inserts disposed snugly in said recesses and each having a narrow flat inner face, two substantially parallel side faces exposed at the exterior of said lure, extending to and merging with the side faces of said central portion and merging with said enlarged end portions and forming parts fo the exterior surfaces of said lure, and outer longitudinally-extending faces merging with said outer edges of said enlarged end portions, said inserts being of light rays-transmitting colored material differing from the color of said side faces of said central portion and enlarged end portions; and attaching means securing said inserts to said main body.

(References on following page)

References Cited in the file of this patent

UNITED STATES PATENTS

| | | |
|---|---|---|
| 299,037 | Thompson et al. | May 20, 1884 |
| 1,477,864 | Bolton | Dec. 18, 1923 |
| 2,149,464 | Potts | Mar. 7, 1939 |
| 2,163,666 | Carter et al. | June 27, 1939 |
| 2,480,580 | Hopkins | Aug. 30, 1949 |
| 2,502,562 | Fike | Apr. 4, 1950 |
| 2,594,673 | Nichols | Apr. 29, 1952 |

FOREIGN PATENTS

| | | |
|---|---|---|
| 406,806 | Germany | Dec. 1, 1924 |
| 610,384 | Great Britain | Oct. 14, 1948 |
| 634,022 | Great Britain | Mar. 15, 1950 |